July 13, 1965  M. FRENZEL  3,194,489
RADIAL PISTON FOR ROTARY ENGINES
Filed March 20, 1964

INVENTOR
MANFRED FRENZEL
BY
*Toulmin & Toulmin*
ATTORNEYS

United States Patent Office 3,194,489
Patented July 13, 1965

3,194,489
RADIAL PISTON FOR ROTARY ENGINES
Manfred Frenzel, Burscheid, Cologne, Germany, assignor to Goetzewerke Friedrich Goetze Aktiengesellschaft, Burscheid, Cologne, Germany, a corporation of Germany
Filed Mar. 20, 1964, Ser. No. 353,628
Claims priority, application Germany, Mar. 20, 1963, G 37,309
6 Claims. (Cl. 230—145)

The invention is directed to a radial packing or seal for rotary engines, especially combustion-powered engines, which consists in several sealing strips lying in separate grooves at the piston corners.

It is known practice to seal the piston of rotary machines by means of several packing or sealing strips, according to which practice the sealing strips are accommodated in a common groove and are pressed by a spring radially against the inner wall of the shell or housing. In such an arrangement the individual strips influence one another so strongly, that the advantageous effect of several strips is lost. Therefore there have heretofore been provided in connection with the use of several strips, separate grooves for each strip. Although the sealing effect is thereby improved, the production of grooves, especially in the case of smaller engines presents special difficulties, since the flanks of the grooves have to be machined as finely and as accurately as possible.

It is the basic problem of the invention to simplify the production of the grooves and to further increase the beneficial effect of a multi-strip seal.

According to the invention it is proposed that the individual grooves be formed by the installation of an insert member, of inverted T-shape in cross section, into a rectangular groove in the piston. The machining of the groove flanks thus is facilitated, since the groove can be formed considerably wider than in the usual case. Likewise the flanks of the insert member can be conveniently machined. It is possible to support the sealing strips resiliently with respect to the insert member, so that the latter may be seated solidly upon the groove bottom. The insert member can likewise be made resilient solely with respect to the piston, and form with the sealing strips a common sealing structure. If, on the other hand, the sealing strip and the insert member are separately equipped with springs, an optimum in sealing action can be achieved, since the insert member has a vibration-damping effect, whereby chatter marks or scoring can be avoided.

Advantageously, the insert member consists of two parts which are longitudinally or axially slidable with respect to each other, in which arrangement a spring can be provided between the individual parts which axially urges each of the two parts of the insert member against a respective side wall. The insert member can be axially or radially divided, the axial separation of the insert member offering the advantage that substantially no gaps exist between the parts to be sealed. Insofar as may be desired, by the arrangement of a spring or the like between the parts of the insert member and the piston undesired radial movement of the parts of the insert member can be avoided. If the two parts of the member are also radially movable with respect to each other and urged radially outward to the sealing surface of the packing strips, the efficiency of the seal is further favorably influenced.

It is further possible to so form the sealing strips at the exterior of the insert member in the range of the sealing surfaces that there is produced a very nearly closed or unbroken radially extending sealing structure.

In the drawing, wherein like reference numerals indicate like or corresponding parts:

Figure 1:
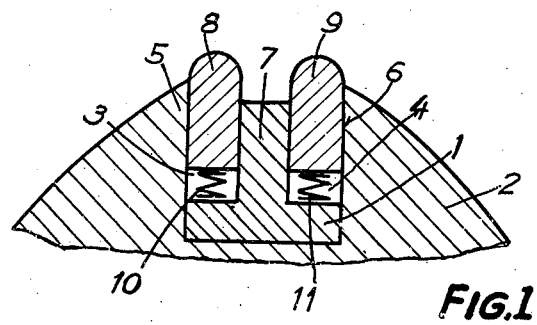
FIG. 1 is a cross section of the piston seal of the invention with an insert member seated on the groove bottom.

Referring to FIG. 1, the insert member is seated in a groove of piston 2, whereby grooves 3 and 4 are formed between the groove flanks 5, 6 and the radial shank 7 of the member 1. Disposed in the grooves 3, 4 are respective sealing strips 8 and 9, which are pressed by the springs 10, 11 against the inner wall of the cylinder housing.

Figure 2:
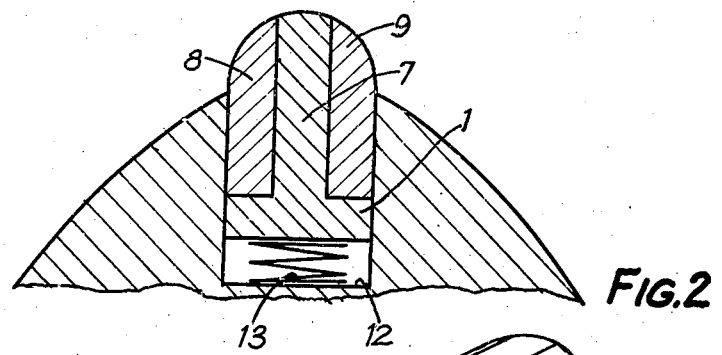
FIG. 2 is a similar cross section of a piston seal wherein an insert member is provided with a spring.

In FIG. 2 the insert member 1 is resiliently supported with respect to the groove bottom 12 by the spring 13. The radial shank 7 of the insert member 1 extends to the sealing edges of the sealing strips 8 and 9 which with the radial shank 7 form a common sealing structure engageable with the cylinder housing.

Figure 3:
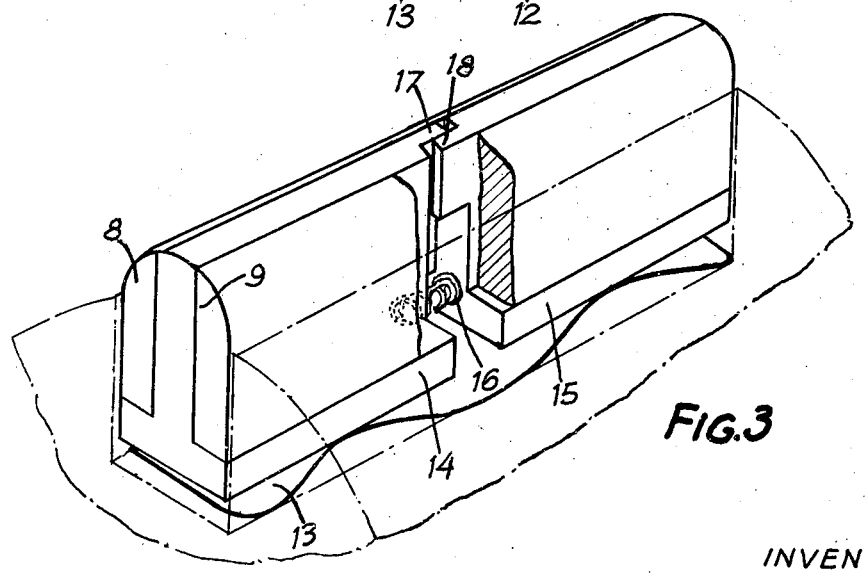
FIG. 3 illustrates a seal similar to that illustrated in FIG. 2 with an insert member of divided construction.

The insert member illustrated in FIG. 3 consists of the longitudinally extending parts 14, 15, between which is disposed an axially acting spring 16, which urges the parts axially apart. The adjacent portions of the parts 14 and 15 are provided with tongues 17, 18 disposed in overlapping relation to prevent the passage therethrough of the gases to be sealed off. The spring 13 urges the insert parts 14, 15 and the sealing strips 8, 9 radially outward.

Changes may be made within the scope and spirit of the appended claims which define what is believed to be new and desired to have protected by Letters Patent.

I claim:

1. In a sealing structure for rotary combustion engines, a housing, a rotary piston in said housing, said piston having grooves at the corners thereof, sealing means carried by said piston and cooperating with said housing, said sealing means comprising an insert member of generally inverted T-shape in cross-section inserted in said groove in said piston with the head of the T at the radial inner end of the groove and cooperable with the walls thereof to define two grooves, and sealing strips slidably received in said last-named grooves.

2. A sealing structure as defined in claim 1, comprising in further combination spring means engageable with the head of said T-shaped member for resiliently supporting the latter and such sealing strips in a radial direction.

3. A sealing structure as defined in claim 2, wherein said insert member is constructed in two longitudinally extending parts axially slidable with respect to each other.

4. A sealing structure as defined in claim 3, comprising in further combination, a spring operatively disposed between said parts and urging the latter in opposite axial directions.

5. A sealing structure as defined in claim 4, wherein said parts of the insert member are provided with axially extending overlapping portions.

6. A sealing structure as defined in claim 1, wherein spring means are positioned at the bottom of each of said two grooves contacting said strips and urging them outwardly.

References Cited by the Examiner
UNITED STATES PATENTS

| 660,676 | 10/00 | Andersson | 123—8 |
|---|---|---|---|
| 1,497,239 | 6/24 | Johnson | 123—8 |
| 2,440,593 | 4/48 | Miller | 230—207 X |
| 3,044,687 | 7/62 | Davey | 230—152 |

KARL J. ALBRECHT, Primary Examiner
WILBUR J. GOODLIN, Examiner.